United States Patent [19]

Steffick, Jr.

[11] 4,232,470
[45] Nov. 11, 1980

[54] FISH HOOK

[76] Inventor: Joe A. Steffick, Jr., 2 Millbrook Rd., Bridgeport, W. Va. 26330

[21] Appl. No.: 4,212

[22] Filed: Jan. 17, 1979

[51] Int. Cl.³ .......................................... A01K 83/00
[52] U.S. Cl. .................................... 43/43.16; 43/44.82
[58] Field of Search ................... 43/43.16, 44.82, 42.7, 43/42.15, 42.25, 42.44, 42.37, 42.38, 44.8

[56] References Cited

U.S. PATENT DOCUMENTS

| 13,649 | 10/1855 | Johnson | 43/44.82 X |
| 696,018 | 3/1902 | Edgar | 43/44.8 |
| 1,781,598 | 11/1930 | Peckinpaugh | 43/42.25 |
| 2,750,704 | 6/1956 | Bemis | 43/43.16 |
| 3,399,483 | 9/1968 | Naffziger | 43/44.8 X |

FOREIGN PATENT DOCUMENTS 1085713  2/1955  France ..................................... 43/43.16

Primary Examiner—Nicholas P. Godici
Attorney, Agent, or Firm—Jacobi, Lilling, Siegel & Presta

[57] ABSTRACT

A fish hook with a reverse bend near the end of the shank which forms an almost closed loop. A second hook or auxiliary lure or streamer may be attached by slipping the eye thereof over the point and barb of the first hook and snapping the eye of the second hook into the loop near the end of the shank of the first hook.

3 Claims, 3 Drawing Figures

FISH HOOK

BACKGROUND OF THE INVENTION

In the world of sport fishing, advances in equipment have come so fast in recent years as to become bewildering. Indeed, some of the new lures and accessories may be more directed toward catching the fisherman than the fish.

The common fish hook is one of the items of equipment that has been left by the wayside in these advances. It would seem that fishermen have passed over this most basic of items in search of novelties in lures, rods, reels, and other accessories that truly are secondary to the function of the hook itself.

It is common in both bait and lure fishing to use multiple hooks in series to increase the likelihood of hooking a fish when it feeds or strikes. Hooks in series are normally tied individually to the line or leader and dangel freely in an independent manner. This leads to hooks twisting up in the line with following hooks, resulting in tangles, frustration and occasionally personal injury. Also, the use of hooks in series usually requires knotting of the hooks onto the line with the resulting weakness that any knot causes in a line.

SUMMARY OF THE INVENTION

The fish hook of the present invention eliminates the requirement of individually tying hooks in series to a line. In addition, the hook of this invention may be used as an anchor for various tails, streamers or lures. The fish hook comprises a conventional eye for attaching the line or leader and a conventional shank. Where the shank normally curves into the hook portion, however, it is formed into an almost closed "U" shape and then recurved into a conventional hook and barb. The almost closed "U" shaped bend defines a loop portion which serves as an anchor or attachment point for subsequent hooks, lures or streamers which may be passed over the hook and barb and snapped into the loop portion. This hook construction eliminates potential for tangling in trailing line and multiple knots which could weaken the line.

DESCRIPTION OF THE PREFERRED EMBODIMENT

Figure 1:
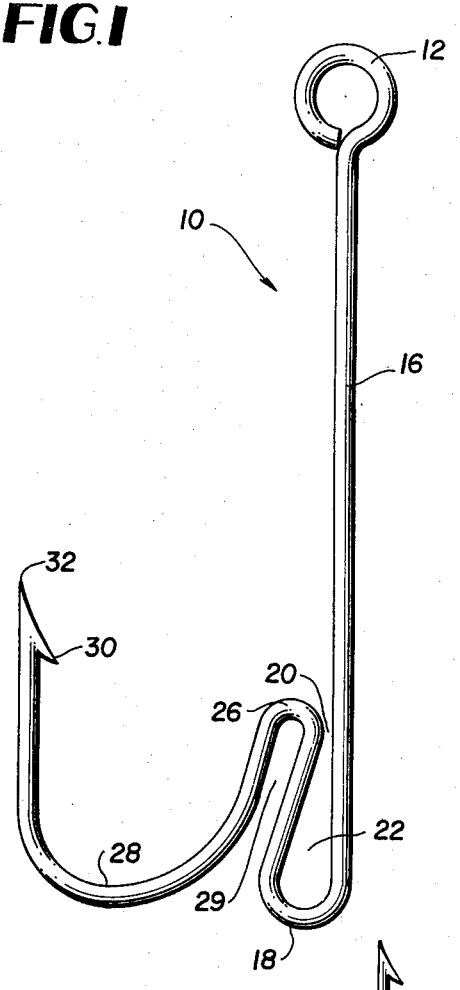
FIG. 1 is a side elevational view of the hook of the present invention.

As shown in FIG. 1, the fish hook 10 of the present invention preferably formed of wire as is common in the art, and comprises a conventional attachment eye 12 formed on one end of a shank 16 in any convenient manner.

The shank 16 extends downwardly from the eye 12 for a suitable distance as is common in fish hooks and then is formed into a fairly tight "U" shaped loop portion 18. The loop portion 18 may be of any suitable size and shape. Preferably, the width of the gap 20 where the loop portion 18 curves back to its closest approach to the shank 16 is smaller than the diameter or thickness of the wire from which the hook 10 is made or the wire from which a second hook or lure to be mounted thereon is made. The width 22 of the loop portion 18 preferably is several times the diameter of the wire from which the hook 10 or a second hook or lure to be mounted thereon is formed.

The loop portion 18 merges into a reversely curved portion 26 which in turn merges into a hook portion 28 formed in a conventional manner. The space 29 between the loop portion 18 and the hook portion 28 preferably is slightly greater than the diameter of the wire from which the hook 10 or a second hook or lure to be mounted thereon is formed.

The hook portion 28 terminates in a conventional barb 30 and point 32 as is the common practice in the fish hook art.

Figure 2:
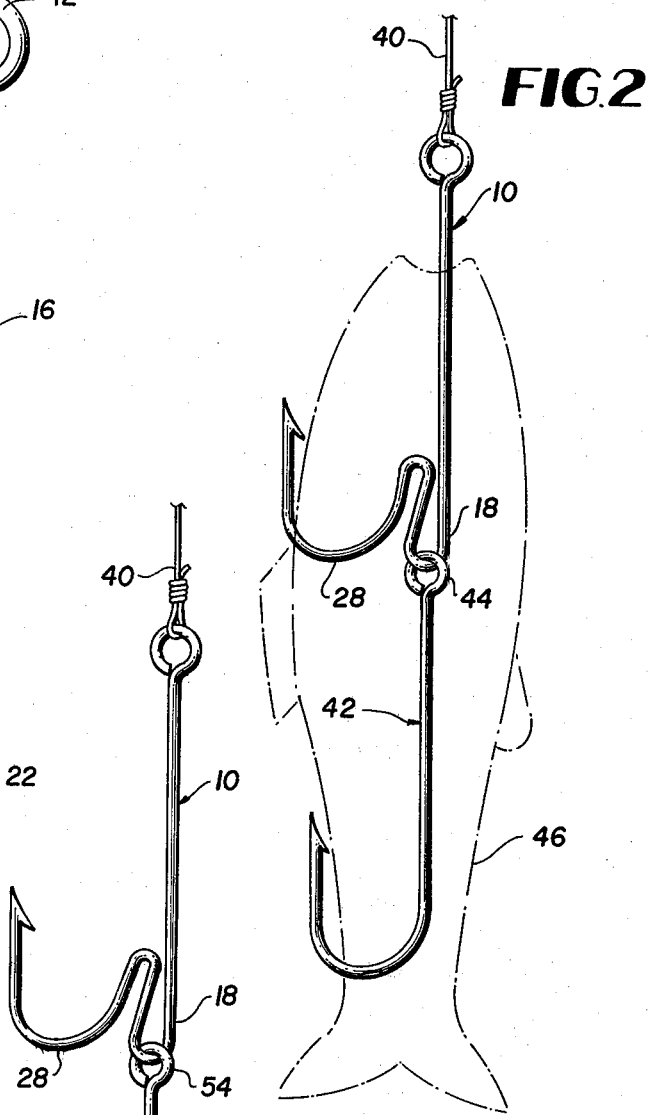
FIG. 2 is a view similar to FIG. 1, showing a second hook attached to the first hook.
Figure 3:
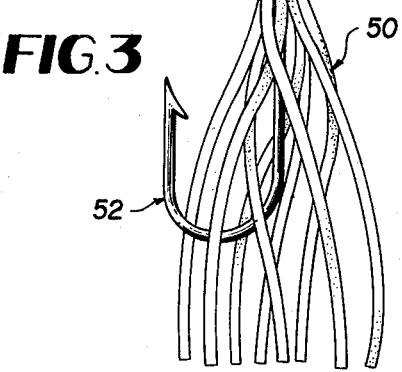
FIG. 3 is another view similar to FIG. 1, showing another type of second hook attached to the first hook.

In practice, the fish hook 10 of the present invention may be used by itself in the same manner as any other fish hook, or it may be used in a number of novel and advantageous ways, two of which are illustrated in FIGS. 2 and 3.

In FIG. 2, the hook 10 is conventionally attached to a line 40 at the eye 12. A second hook 42 of any desired type is removably attached to the hook 10 with its eye 44 snapped within the loop portion 18. To attach the second hook 42, the eye 44 thereof is passed over the point 32, barb 30 and hook portion 28 of the hook 10, and then is snapped into the loop portion 18. This attachment allows the second hook 42 to swing freely within the loop portion 18 and the narrowness of the gap 20 prevents the eye 44 from passing up the shank 16 or back over the hook portion 28. A bait 46, shown in broken lines, may be attached with freedom of movement and the hooks 10 and 42 in this series arrangement provide more likelihood of catching a fish when it feeds or strikes. Also, there is no trailing line between hooks 10 and 42 to become tangled and make the hooks ineffective.

In FIG. 3, a lure or streamer 50 with or without an additional hook 52 is removably attached by means of its eye 54 to the hook 10 in a like manner to that already explained with respect to the embodiment of FIG. 2, and provides another novel fishing arrangement.

It is obvious that the arrangements of multiple hooks in series or the combinations of hooks and auxiliary lures or streamers is almost limitless by using the removable attachment feature of the hook 10 of the present invention. Also, auxiliary hooks or lures may be rapidly snap-fitted on or removed from the hook 10 with a minimum of effort.

What is claimed is:

1. A fish hook, comprising:
   an elongated shank,
   a first generally U-shaped loop portion having one end thereof connected to the lower end of said shank, the other end of said loop portion extending upwardly toward said shank,
   a second generally U-shaped portion connected at one end thereof to the other end of said loop portion and being spaced from said shank a distance less than the thickness of said shank, said second U-shaped portion being curved in a reverse manner to that of said loop portion, the other end of said second U-shaped portion extending downwardly in generally parallel relation to said other end of said loop portion and being spaced therefrom a distance greater than the thickness of said shank,
   a generally U-shaped hook portion connected to the other end of said second U-shaped portion, whereby the eye portion of a second hook or lure may be fitted over said hook portion, passed through said second U-shaped portion, and snap-fitted between said second U-shaped portion and said shank into said loop portion so as to be removably connected to said fish hook.

2. The fish hook of claim 1 wherein said loop portion is of a width greater than the thickness of said shank.

3. The fish hook of claim 1 wherein the upper end of said shank comprises an eye portion, and said hook portion terminates in an upwardly extending outer end with a barb and point.

* * * * *